Oct. 18, 1955  K. E. A. GOTHBERG  2,720,889
LIQUID DISTRIBUTING DEVICE
Filed March 21, 1951

Inventor:
Karl Evald Andreas Göthberg
by his Attorneys
Howson & Howson

Oct. 18, 1955  K. E. A. GOTHBERG  2,720,889
LIQUID DISTRIBUTING DEVICE
Filed March 21, 1951  2 Sheets-Sheet 2

Inventor:
Karl Evald Andreas Göthberg
by his Attorneys
Howson & Howson

United States Patent Office 2,720,889
Patented Oct. 18, 1955

2,720,889

LIQUID DISTRIBUTING DEVICE

Karl Evald Andreas Gothberg, Goteborg, Sweden, assignor to Aktiebolaget Svenska Kullagerfabriken, Goteborg, Sweden, a corporation of Sweden Application March 21, 1951, Serial No. 216,722

Claims priority, application Sweden March 24, 1950

7 Claims. (Cl. 137—262)

Under certain lubricating conditions it has been found advisable to lead the lubricant to the parts to be lubricated in the form of oil drops which are transported through pipes by a stream of air under pressure. In some cases this may be done by first creating an oil mist, which is afterwards precipitated or condensed so that air and drops of oil of ordinary size are obtained instead of the homogeneous mixture of very fine oil particles and air as in the oil mist. If the condensed oil mist is led through a pipe, it will be found that the drops of oil follow the walls of the pipe, while the air flows along the central part of the pipe. If the pipe is horizontal the oil will be concentrated at the lower part of the walls. If the pipe is not horizontal the oil forms a moving layer of varying thickness covering a greater or smaller portion of the wall of the pipe. Conditions will be similar if a mixture of liquid oil and oil mist is led through a pipe.

Hitherto it has not been advisable to branch off a pipe for simultaneously conducting both oil in liquid form and air or oil mist. This is due to the fact that there has been no dependable means of dividing a small flow of oil into two or more branches. If the pipe is branched off in the ordinary manner, for instance by a T-joint, there is risk that the oil will be very unevenly divided between the branches. Further there is no means of afterwards influencing or regulating the distribution.

The present invention relates to a distributing device which makes it possible to distribute the liquid between a plurality of branches in desired proportions. The distributor comprises a housing having an inlet opening and two or more outlet openings and is characterized substantially by a sleeve-shaped distributing member disposed within the housing, the lower edge thereof being obliquely disposed to form a more or less pronounced point.

The invention is illustrated in the accompanying drawings in which.

Figure 1:
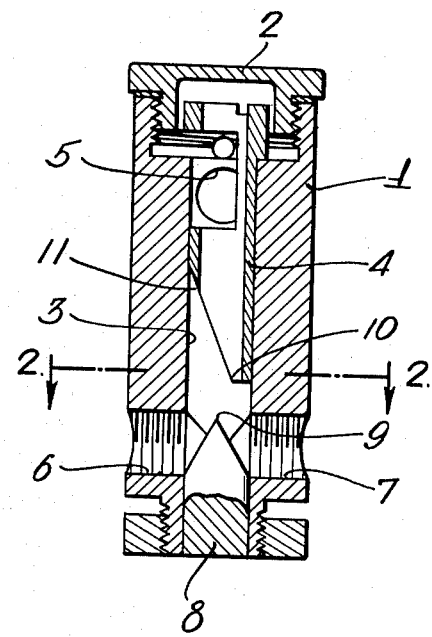
Figure 1 shows an axial section through one form of the invention.
Figure 2:
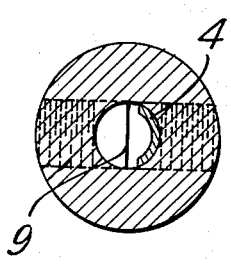
Figure 2 is a sectional view along the line II—II in Figure 1.
Figure 3:
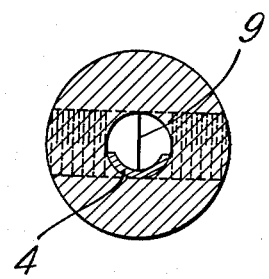
Figure 3 is a sectional view corresponding to Figure 2 but showing the parts in a different position of relative adjustment.

The oil distributor according to Figs. 1–3 comprises a housing 1 to which is screwed a cover 2. A distributor sleeve 4 is disposed in a cylindrical bore 3 in the housing and is capable of being turned in the latter. Its purpose is to distribute the oil, which enters through an inlet opening 5, in desired proportions between a pair of outlet openings 6 and 7. The distributor sleeve 4 can be turned, for example with a screw driver, after the cover 2 has been removed. A plug 8 is pressed into the bottom of the bore. The upper end of the plug is wedge-shaped and forms an edge 9 extending perpendicular to the direction of the openings 6 and 7.

The lower end of the distributor sleeve 4 is formed obliquely to form a tip 10 which is somewhat truncated. The arrangement is such that the tip is pressed firmly against the wall of the bore 3. When the oil which enters the housing 1 and is carried to the distributor sleeve 4 by the air stream reaches the lower oblique edge 11 of the sleeve the layer of oil, which as a rule covers the whole inner wall of the sleeve 4, will follow the edge 11 to the tip 10 where it drops from the sleeve. Thus, when the oil has passed the sleeve, it no longer forms a circular layer but is concentrated to a band, the width of which depends on the width of the tip. If the sleeve is located as shown in Figs. 1 and 2 the band of oil will continue along the right hand part of the wall of the bore 3. Practically all of the oil will therefore leave through the right hand outlet 7 of the distributor. If the sleeve is turned 180° it is apparent that the oil will leave through the opening 6. If the sleeve is positioned halfway between these outer positions, as shown in Fig. 3, the oil will be divided by the edge 9 so that half of it will flow into the left hand outlet 6 and half into the right hand outlet 7. By turning the sleeve distributor 4 in the housing 1, it is thus possible to direct the oil as desired. The distribution of the air between the branches is, however, not affected. It is determined by the resistance in the branches and can be regulated, for instance by valve means of known type in the branch pipes.

Figure 4:
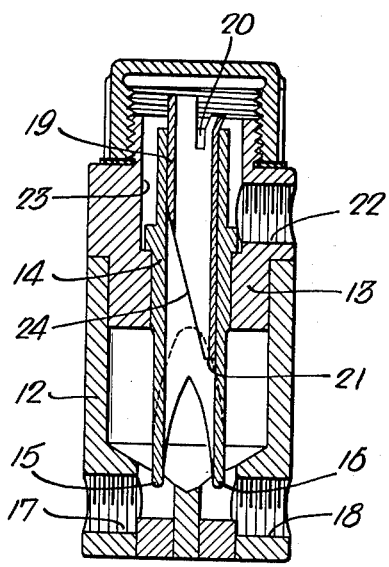
Figure 4 is an axial section through another form of the invention.

The distributor according to Fig. 4 comprises a housing formed from parts 12 and 13 in which is disposed a vertical bushing 14 having a pair of downwardly directed legs or bifurcations 15 and 16. The legs are each located opposite one of the outlets 17 and 18. A turnable distributor sleeve 19 corresponding to the above described sleeve 4 is mounted in the bushing 14. The upper end of the sleeve is split at 20 and expanded somewhat to fit firmly in the bore of the bushing 14. The sleeve 19 is fixed in the bushing by pressing it axially into the latter, after first turning it to the desired position. The lower edge 24 of sleeve 19 is oblique as with sleeve 4 and forms a tip 21, which is somewhat truncated. The housing is provided with an inlet 22, which opens into an annular chamber 23 between the bushing 14 and the part 13 of the housing. The oil rises in this chamber until it flows over into the sleeve 19. As previously described the oil follows the oblique edge 24 and in the position of the sleeve 19 shown, will flow out onto the right hand leg 16 of the bushing and from there to the outlet 18. By turning the sleeve 19 to the required position it is possible to distribute the oil as desired between the legs 15 and 16 and thus between the outlets 17 and 18.

Figure 5:
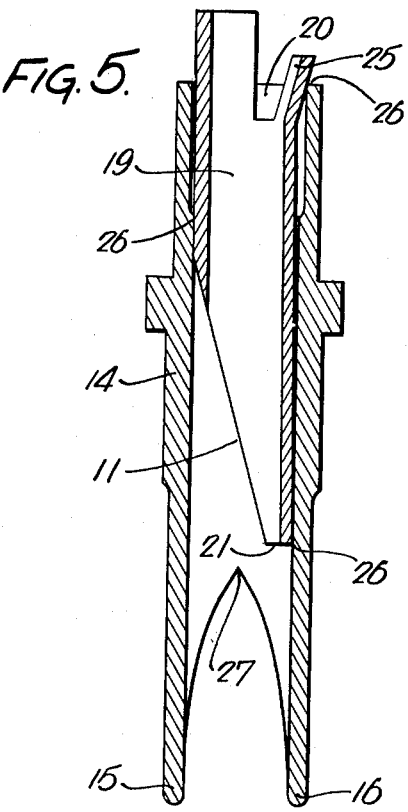
Figure 5 is an enlarged fragmentary sectional view according to Figure 4.

Fig. 5 shows on a larger scale the manner in which the sleeve 19 is fixed in the bushing 14. Of the two upper parts of the sleeve formed by the slot 20 only that designated 25 is bent outwards. Further the bore of the bushing 14 is somewhat greater at the top where the sleeve is inserted. The fit over the rest of the sleeve is comparatively loose. When the sleeve is pressed into the bore of the bushing there will be contact between the sleeve 19 and the bushing 14 at three points, designated 26 in the drawing. The downwardly directed tip 21, as shown, forms one of these points. Since the tip is in firm contact with the wall of the bore there is no risk of interrupting the flow of oil from the sleeve to the wall of the nozzle as would be the case if there were play between these parts.

The upper part of the sleeve, denoted by the numeral 25, which is directly over the downwardly directed tip 21 of the sleeve is somewhat lower than the part on the other side of the slot 20. This is to cause as great a portion of the oil flow as possible to flow into the sleeve over the tip 21. The greater part of the oil will thus flow straight downwards in its passage through the sleeve, which increases the possibility of directing the flow of oil.

The shape of the bushing at the juncture point 27 of the two legs also influences the distribution of the oil. When the distributor sleeve is at about its central position the oil flows down to this point, where it is divided into two lesser streams, which continue out onto the respective legs of the bushing. Since the edges of the legs form an angle at 27, the distribution will be more accurate than if the edge were curved.

Figure 6:
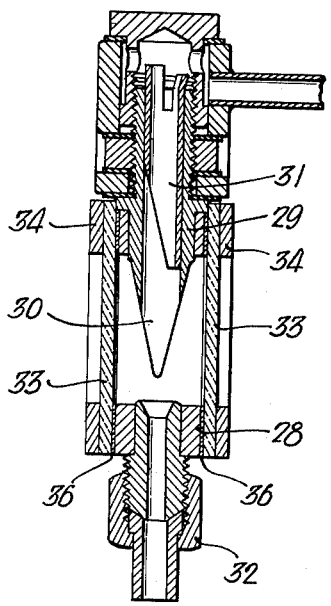
Figures 6 and 7 show an axial section and side view respectively of a distributor device with transparent walls to enable the flow of oil to be observed.
Figure 7:
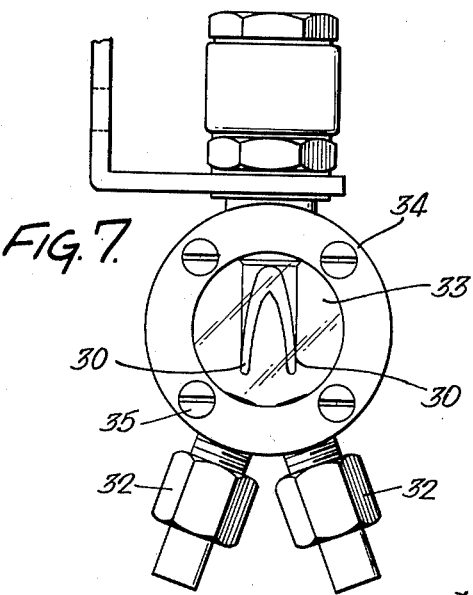

The distributor according to Figs. 6 and 7 comprises a housing 28, a vertical bushing 29 with two downwardly directed legs 30 and a distributing sleeve 31 of the same design as the sleeve 19 described above. The housing comprises a ring to which the bushing 29 and two pipe connections 32 for branch lines are connected and has two covers 33 of transparent material. The covers are fixed to the ring by washers 34 and screws 35. Packings 36 are held between the ring and the covers.

In this case the legs of the bushing, which according to Fig. 4 were located within the outlet openings, are instead located a few millimeters above the openings. The oil dropping from the legs can thus easily be seen through the transparent covers.

All of the forms of the invention illustrated have a single inlet and two outlets for oil and air. They can therefore be used for dividing a lubricant line into two branches. If it is desired to branch off the line further a distributor may be inserted in each of these branches whereby a total of four branches is obtained. The branches can be subdivided in turn until the desired number of branch lines is obtained. In certain cases the distributor may be made with a greater number of outlets and a corresponding number of tips or legs. The device has been described above as used in connection with the distribution of oil but can of course be used for other liquids.

I claim:

1. A liquid distributing device for use in lines for conveying liquids, said device comprising a housing having an inlet opening at its upper part and a plurality of outlet openings at its lower part; a sleeve shaped distributing member disposed substantially vertically within said housing with the upper end thereof in liquid flow communication with said inlet opening, the lower edge of said distributing member being obliquely disposed across substantially the entire width of the distributing member whereby said edge is lower at one side of the member than at the other side thereof, the lowest part of said edge being shaped to provide a horizontal edge portion at which liquid flowing down the wall of said member from the inlet opening is concentrated for controlled distribution of said flow to the outlet openings; and diverting means operatively associated with said horizontal edge portion for diverting the liquid from said edge portion to said openings, said distributing member being mounted for angular adjustment about its axis so as to bring said horizontal edge portion into registration selectively with said outlet openings so as to concentrate the flow of liquid in either of said outlet openings and, alternatively, into different positions with respect to said diverting means for diversion of the liquid to said openings in selected predetermined proportions.

2. A liquid distributing device for use in pipe lines for conveying a liquid, said device comprising a housing having an inlet opening for the liquid and a plurality of outlet openings below said inlet, a substantially vertical bushing disposed within the housing so that liquid entering the inlet opening will flow into the top of the bushing, the lower end of the bushing having bifurcations directed respectively to individual outlet openings, and a sleeve-like distributing member mounted within the bore of said bushing down the wall of which the said liquid will flow toward the lower end of the bushing, the edge of the distributing member at the lower end of that member being obliquely disposed to the vertical so as to form a tip at the lower end of the member and to afford a downwardly tapering path for concentration of the liquid flow at said tip for controlled distribution of said flow to the said bifurcations and thence to the outlet openings.

3. A distributing device according to claim 2 wherein the said tip of the distributing member terminates in a horizontal edge along which the said concentration of downwardly flowing liquid occurs.

4. A distributing device according to claim 2 wherein the distributing member is adjustable in the bushing to direct the tip toward one or other of said bifurcations or to the point of juncture of said bifurcations.

5. A distributing device according to claim 4 wherein the said juncture of the bifurcations forms a relatively sharp upperly directed notch.

6. A distributing device according to claim 5 wherein the bifurcations taper downwardly toward their lower ends.

7. A liquid distributing device according to claim 1 wherein there are at least two horizontally spaced and axially alined outlet openings in the lower part of said housing, and wherein said diverting means comprises a wedge-shaped member positioned substantially vertically within the lower part of said housing between said spaced outlet openings and below said horizontal edge portion of said distributing member, the upper edge of said wedge-shaped member extending horizontally and transversely across the space between said spaced and axially alined outlet openings with each of the side surfaces of said wedge-shaped member diverging from said horizontally and transversely disposed edge and toward one of said outlet openings.

References Cited in the file of this patent

UNITED STATES PATENTS

| | | |
|---|---|---|
| 162,382 | Hess | Apr. 20, 1875 |
| 320,312 | Thayer | June 16, 1885 |
| 416,391 | Baird | Dec. 3, 1889 |
| 713,466 | Louis | Nov. 11, 1902 |
| 763,693 | Taum | June 28, 1904 |
| 850,762 | Kolla | Apr. 16, 1907 |
| 1,121,976 | Chandler | Dec. 22, 1914 |
| 1,768,129 | McCain | June 24, 1930 |

FOREIGN PATENTS

| | | |
|---|---|---|
| 4,955 | Great Britain | 1907 |